United States Patent Office 3,228,397
Patented Jan. 11, 1966

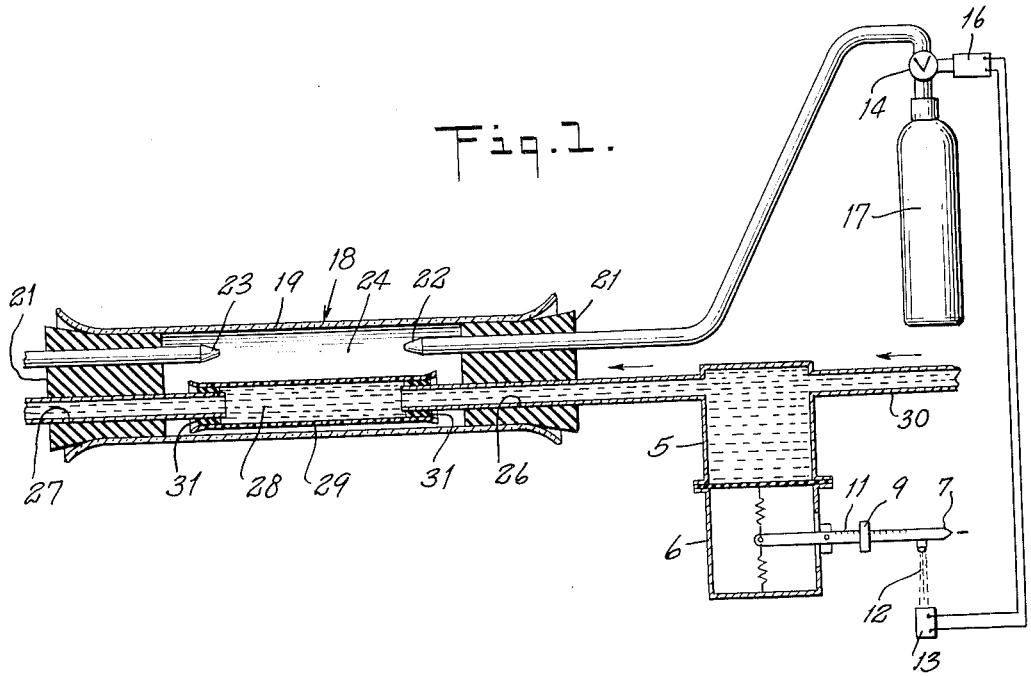

3,228,397
APPARATUS AND PROCESS FOR MONITORING LIQUID FLOW IN LIVING ANIMALS
Gerald Moss, Albany, N.Y., assignor to United States Catheter & Instrument Corporation, Glens Falls, N.Y., a corporation of New York
Filed May 24, 1962, Ser. No. 197,501
9 Claims. (Cl. 128—214)

This invention relates to new and useful improvements in the external monitoring liquid flow and more particularly is concerned with maintaining a liquid flow during perfusion that maintains a constant weight of the subject to thus insure an infusion equal to the effusion.

Whenever there is a simultaneous inflow and outflow of large volumes of blood during total perfusion, organ perfusion, hemodialysis, etc., there is always the danger that one rate may exceed the other. Over an extended period of time, there can be appreciable hypo- or hypervolemia, with danger of shock or congestion, respectively. In such procedures as local anticoagulation in artificial kidney work, when the quantity of heparin added to blood entering the dialysis equipment must be exactly balanced by the amount of protamine added to the blood before it returns to the patient, significant mismatch in either direction would be disastrous.

Thus in many instances, both medical and otherwise, it is essential to maintain a highly critical and extremely sensitive flow volume relative to a weight or other variable that can be measured with a moving bar such as a balance beam.

Therefore, it is an object of this invention to provide a method and apparatus for externally monitoring a liquid flow.

It is an added object of this invention to provide an automatic and continuous process (and apparatus) to maintain an absolute or relative weight of a body during liquid infusion and/or effusion.

It is a further object of this invention to provide a process (and apparatus) to vary one flow of liquid so as to maintain the constant weight of a body having both an infusion and effusion of the liquid.

It is an additional object of this invention to provide a process (and apparatus) to match the inflow or outflow of one body relative to that occurring in another body.

It is another object of this invention to provide a process (and apparatus) to increase the inflow or decrease the outflow to a body as the weight of that body is decreased and to decrease the inflow or increase the outflow as the weight is increased.

It is also an object of this invention to provide a process (and apparatus) for monitoring blood flow in and out of a subject by increasing or decreasing one of the flows to maintain the subject's weight constant with the regulation being external to the blood flow so as to avoid hemolysis, clotting, or other deleterious effects.

I have found that liquid flow may be regulated relative to an independent variable by having the flow pass through a chamber subject to a gas pressure in which pressure changes are induced relative to the independent variable. Thus a solenoid gas valve operatively connected to a compressed gas source and a photoelectric cell that is opened or closed by the independent variable can serve to induce the appropriate pressure changes.

With these and other objects and features in mind, the nature of which will be more apparent, the invention will be more fully understood by reference to the drawings, the accompanying detailed description and the appended claims.

In the drawings:
FIG. 1 is a diagrammatic view of a blood flow control apparatus constructed in accordance with this invention; and
FIG. 2 is a partial diagrammatic view of a modified flow control apparatus.

As illustrated in FIG. 1, a relatively simple device has been designed and constructed which maintains hemodynamic equilibrium by automatically and continuously monitoring the subject's weight and adjusting flow rates accordingly. The appropriate changes in flow rates are gradual, so that the hemodynamics will not be acutely disturbed. The regulator is external to the blood flow, and will not induce hemolysis, clotting, or other deleterious effects.

The subject 5 is placed upon a scale 6 and the pointer 7 set at the null position by adjustment of the movable weight 9 on the balance arm 11. A beam 12 of light which impinges upon a photoelectric cell 13 is broken when the pointer 7 moves downward as the subject loses weight.

The photoelectric cell 13, when activated, closes an electrically operated gas valve 14 through a standard electronic solenoid unit 16 (may be set so that activation of the cell closes or opens the valve). The valve 14 is connected on one side to a compressed air tank 17 and on the other side to a variable flow resistance unit 18.

The resistance consists of a large glass tube 19 closed at both ends with 2-hole rubber stoppers 21. Two of the holes at opposite ends have capillary tubes inserted therethrough with tiny openings leading into chamber 24 within tube 19. Tube 22 is connected to the valve 16 and tube 23 is open to the atmosphere. In the alternative, tube 23 may be eliminated if valve 14 is a three-way valve that connects tube 22 at all times with either tank 17 or the atmosphere. The remaining two holes at opposite ends have ordinary glass tubing leading into chamber 24, the inflow tube 26 being connected to subject 5 and the outflow tube 27 carrying the blood 28 away to the desired destination, e.g. a heart-lung machine, and is returned to the subject 5 at 30. However, the blood is not permitted to flow freely into chamber 24, as tubes 26 and 27 are connected with a thin rubber tubing 29 by 1-hole stoppers 31.

As the subject 5 loses weight and the pointer 7 falls, the beam of light 12 is broken and the gas valve 14 opened. Gas slowly enters the pneumatic chamber 24 through capillary tube 22, and the increasing pressure upon the rubber tubing 29 increases the resistance of blood flow through it. This will slowly cause the rate of blood outflow to diminish until the patient has regained sufficient blood to become normovolemic. At this time, the pointer again will allow the light to fall on the photoelectric cell and the outflow rate is adjusted accordingly. The fluctuations in blood volume can be made to stay within 5 to 10 ml. When the patient has regained his weight, and tends to accumulate a few milliliters excess, capillary tube 23 slowly allows the escape of gas, resistance falls, and outflow increases.

As shown here, the flow resistance unit is located on the outflow side of the subject and thus increased resistance will increase the weight of the subject. The unit could be placed on the inflow side where increased pressure would decrease the subject's weight. At either location, the effect of the resistance unit may be reversed by reversing the light beam relative to the beam, the opening of the valve, etc. The unit is, of course, initially set at a desired range which may be changed by a port provided for manual setting of the original pressure in the chamber.

A similar device as shown in FIG. 2 can automatically and continuously match the inflow or outflow from one reservoir 32 to that occurring in another 33 where the amount of flow is negligible relative to the amount of liquid in the reservoir. The two reservoirs are placed on the opposite pans 34 of a balance 36, and initially balanced so that the pointer 37 barely impinges upon the beam 38 of light. The flow to or from one can then be controlled to match the weight changes in the other.

Thus in artificial kidney work, the left reservoir 32 may contain the heparin being added to blood entering the dialysis equipment and the right reservoir 33 may contain the protamine being added to the blood before it returns to the patient. Since the two must be in exact balance, the outflow from reservoir 33 and the photoelectric cell may be operatively connected to the variable flow resistance unit 18 and solenoid unit 16 in the same manner as shown in FIG. 1 to insure that the flows are equal.

The capillary tubes and delivered gas pressure are chosen so that rates of change of flow are suitable for the conditions; for example 20 cc. per minute per minute increase or decrease, with flow of 400 cc. per minute at 130 m./m. mean pressure. The pneumatic chamber is initially filled with gas to allow approximately proper outflow; for example, 20 cc. at atmospheric pressure. After surgical procedures are completed, and before the blood flows are started, the balance weight is adjusted so that the pointer is at the null point, that is, the subject is "weighed." The automatic device is turned on, and the blood flows started. Initial profound mismatch can be corrected manually by adding or subtracting gas from the pneumatic chamber via the port 23.

Many other uses and modifications of the disclosed process and apparatus will be obvious to those skilled in the art.

I claim:

1. A process for maintaining a constant weight of a living animal having liquid flow between an external source and said animal comprising inducing gaseous pressure changes in a chamber relative to weight change of said animal and passing said liquid flow through said chamber in a flexible conduit responsive to said pressure whereby said animal is maintained at said constant weight.

2. An apparatus for maintaining a constant weight of a living animal having liquid flow between an external source and said animal comprising means for detecting a change in the weight of said animal, means for inducing a gaseous pressure change in a chamber corresponding to said weight change, and means for passing said flow in a conduit within said chamber, said conduit being flexible and responsive to said pressure whereby said apparatus maintains said constant weight.

3. A process for maintaining the weight of a living animal relative to a body that manifests a varying weight wherein there is liquid flow between said animal and an outside source comprising inducing gaseous pressure changes in a chamber relative to said varying weight, passing said liquid flow through said chamber in a flexible conduit responsive to said pressure whereby said animal maintains said weight relative to said varying weight.

4. A process for automatically and continuously maintaining the weight of a living animal that is simultaneously having blood infusion and effusion comprising placing said animal on a balance having a weight indicator, establishing a desired weight, providing an electric circuit to be changed when said indicator varies from said desired weight, inducing a pressure change in a chamber by the change in said circuit, passing one of said fusions within a flexible conduit through said chamber whereby the pressure change effects said one fusion to counteract any change from said desired weight.

5. A process for automatically and continuously maintaining the weight of a living animal that is simultaneously having blood infusion and effusion comprising placing said animal on a balance having a weight indicator, establishing a desired weight, arranging a photoelectric cell and associated light beam to be broken when said indicator varies from said desired weight, operatively connecting said photoelectric cell to a solenoid valve positioned between a compressed gas source and a pressure chamber, said chamber having only a bleed opening to the atmosphere, passing said effusion through said chamber through a flexible conduit responsive to pressure within said chamber, whereby said effusion is reduced to compensate for any weight loss.

6. A process for maintaining one flow constant relative to another flow comprising establishing separate reservoirs for each flow, both said flows being between a living animal and said respective reservoirs, positioning said reservoirs on opposed sides of a balance having an indicator, arranging a photoelectric cell and associated light beam to be broken when said indicator varies from the desired relationship between said reservoirs, operatively connecting said photoelectric cell to a solenoid valve positioned between a compressed gas source and a pressure chamber, said chamber having only a bleed opening to the atmosphere, passing said other flow through said chamber through a flexible conduit responsive to pressure within said chamber, whereby said flow is effected to compensate for any change in said one flow.

7. An apparatus for maintaining a first weight of one body relative to another body that manifests a varying second weight wherein there is liquid flow between said one body and a living animal comprising scales for constantly weighing said other body, means for detecting a change in the weight of said other body, means for inducing a gaseous pressure change in a chamber corresponding to said other weight change, and means for passing said flow in a conduit within said chamber, said conduit being flexible and responsive to said pressure whereby said apparatus maintains said first weight relative to said second varying weight.

8. An apparatus for maintaining a first weight of one body relative to another body that manifests a varying second weight wherein there is liquid flow between said one body and a living animal comprising scales for constantly weighing said other body, a photoelectric cell so mounted that its associated light beam is broken by the balance beam when the weight of said other body varies, a solenoid valve operatively connected to said photoelectric cell, a compressed gas source operatively connected on one side of said valve, a pressure chamber operatively connected to the other side of said valve, said pressure chamber including a bleed opening to the atmosphere and a flexible conduit passing through said chamber responsive to pressure in said chamber, and connecting means for said liquid flow between said flexible conduit and said one body whereby said apparatus maintains said first weight relative to said second varying weight.

9. An apparatus for inducing a second flow in a constant relationship to a first flow comprising a balance having two opposed pans and an indicator, a reservoir on each said pan, means to pass said flow between a living animal and a respective one of said reservoirs, a photoelectric cell so mounted that its associated light beam is broken by the indicator when the desired relationship of said reservoirs is changed, a solenoid valve operatively connected to said photoelectric cell, a compressed gas source operatively connected on one side of said valve, a pressure chamber operatively connected to the other side of said valve, said pressure chamber including a bleed opening to the atmosphere and a flexible conduit passing through said chamber responsive to pressure in said chamber, and connecting means for said liquid flow between said flexible conduit and said second reservoir whereby a constant relationship between said flows is maintained.

References Cited by the Examiner

UNITED STATES PATENTS

| | | | |
|---|---|---|---|
| 2,719,018 | 9/1955 | Sebardt | 137—91 X |
| 2,742,901 | 4/1956 | Krauthamer | 128—214 |
| 2,904,063 | 9/1959 | Wall et al. | 251—5 X |
| 2,915,078 | 12/1959 | Ochs | 251—5 X |
| 3,051,192 | 8/1962 | Fagot | 137—403 |

RICHARD A. GAUDET, *Primary Examiner.*

JORDAN FRANKLIN, ROBERT E. MORGAN,
*Examiners.*